United States Patent [19]

Dittié

[11] Patent Number: 4,558,987
[45] Date of Patent: Dec. 17, 1985

[54] APPARATUS FOR REGULATING AXIAL COMPRESSORS

[75] Inventor: Bernhard Dittié, Moers, Fed. Rep. of Germany

[73] Assignee: Mannesmann Aktiengesellschaft, Dusseldorf, Fed. Rep. of Germany

[21] Appl. No.: 720,051

[22] Filed: Apr. 5, 1985

Related U.S. Application Data

[63] Continuation of Ser. No. 534,393, Sep. 22, 1983, abandoned, which is a continuation of Ser. No. 274,809, Jun. 18, 1981, abandoned.

[30] Foreign Application Priority Data

Jul. 8, 1980 [DE] Fed. Rep. of Germany ....... 3025753

[51] Int. Cl.$^4$ ............................................. F01D 17/16
[52] U.S. Cl. .................................................... 415/162
[58] Field of Search ........ 415/150, 151, 155, 159–162, 415/181

[56] References Cited

U.S. PATENT DOCUMENTS

| | | | |
|---|---|---|---|
| 1,462,483 | 7/1923 | Carpenter | 415/162 X |
| 2,733,853 | 2/1956 | Trumpler | 415/161 |
| 2,933,234 | 4/1960 | Neumann | 415/160 X |
| 3,588,270 | 6/1971 | Boelcs | 415/162 |
| 4,295,784 | 10/1981 | Manning | 415/162 |

FOREIGN PATENT DOCUMENTS

| | | |
|---|---|---|
| 2403113 | 8/1975 | Fed. Rep. of Germany . |
| 2502986 | 2/1976 | Fed. Rep. of Germany . |
| 4422143 | 11/1964 | Japan .................................. 415/162 |

OTHER PUBLICATIONS

NASA Report TND-3823 of Jan. 1967.
NASA Report CR-54534 PAW FR-2112 of Aug. 2, 1968.

Primary Examiner—Robert E. Garrett
Assistant Examiner—Joseph M. Pitko
Attorney, Agent, or Firm—Mandeville and Schweitzer

[57] ABSTRACT

This invention relates to an apparatus for regulating axial compressors by means of adjusting two rows of guide vanes, arranged successively in the flow direction, so that the flow will not become discontinuous until the maximum cut-off angle. The guide vanes are symmetrical about their longitudinal axes. The guide vanes of the second row occupy the spaces between the guide vanes of the first row. The nose ends of the second row of guide vanes always overlap the rear ends of the first row of guide vanes. The two rows of guide vanes are adjusted in tandem through an adjustment ring so that the angle of incidence to the flow of the first row is in a predetermined ratio to the angle of incidence of the second row. This ratio is the same as the ratio in length of levers connecting the first and second rows to the adjustment ring.

3 Claims, 5 Drawing Figures

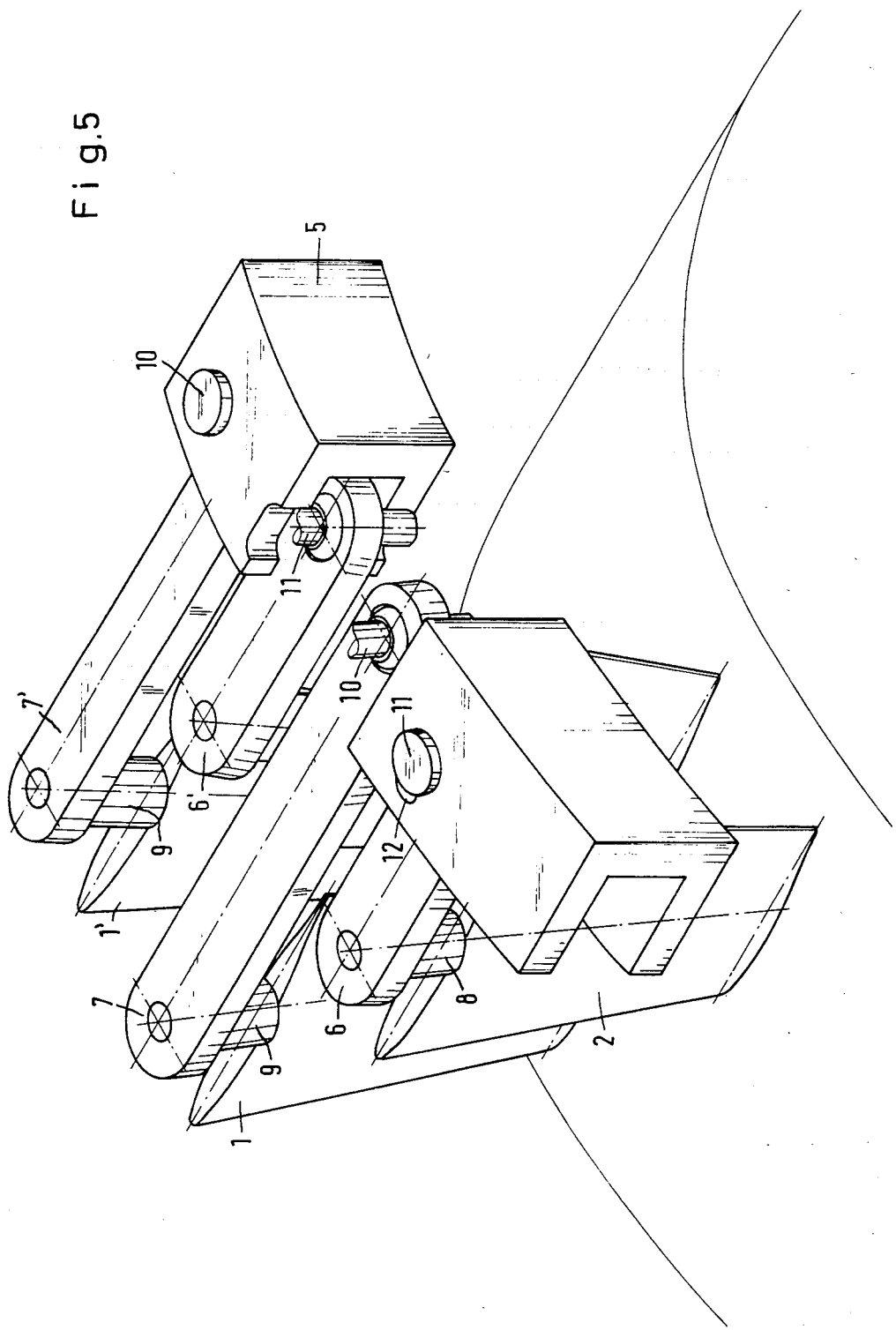

APPARATUS FOR REGULATING AXIAL COMPRESSORS

This is a File Wrapper Coninuation Application of Application Ser. No. 534,393, filed Sept. 22, 1983 which is itself a Continuation Application of Ser. No. 274,809, filed June 18, 1981, both abandoned.

CLAIM OF PRIORITY

This application corresponds to German Patent Application No. P 30 25 753.5, filed July 8, 1980. Applicant hereby claims priority under 35 U.S.C. 119.

BACKGROUND OF THE INVENTION

The invention relates to an apparatus for regulating axial compressors by adjusting two rows of guide vanes arranged successively in flow direction. The guide vanes in their neutral position (vane position at 0° deviation from the direction of the rotor axis) are adjusted parallel to the rotor axis and are each pivotally arranged around a vane rotary axis, so that the guide vanes of the front (first) row, in flow direction, are adjustable relative to the guide vanes of the following row, in flow direction (second flow), by means of an adjustment ring or similar device. The first row has a leading angle of incidence, and to the second row of guide vanes is assigned a second angle of incidence, being at a certain ratio to the first mentined angle of the first row of guide vanes.

The entrance stage plays a special part in regulating axial compressors by adjusting the guide vanes. While up until now the flow direction toward the guide vanes between each two carrying wheels has been changed by regulating the preceding steps, this flow direction has remained always axial for the entrance guide wheel. Beginning with a certain angle of adjustment, the flow in the entrance guide wheel becomes discontinuous, which impairs the effect of the following carrying wheel. A calculation of the aditional losses in the entrance guide wheel and in the first carrying wheel clearly shows that, subsequent to the discontinuity of flow in the entrance guide wheel, a positive regulating effect in counter-torque direction is restrained, a regulating gap occurs in the partial-load region where the flow guidance is smaller than it was prior to flow discontinuity, the effectiveness of the first stage is greatly impaired, and the guide vanes are exposed to strongly fluctuating forces.

In conventional turbo-compressors, the first row of vanes forms the entrance guide wheel. In contrast to the other guide wheels, which are between each two carrying wheels, a special position may be allowed said entrance guide wheel: the adjustment region for the vanes of the entrance guide wheel is preferably only large enough, within the normal regulating region of the machine, for the flow discontinuity not to occur. The adjustment characteristic curve, valid for a certain initial whirl produced in the entrance guide wheel of the first carrying wheel, may be exploited between the discontinuity and absorption boundary.

The velocity of the flow towards the vanes of the entrance guide wheel is always essentially axially aligned.

When the vanes of the entrance guide wheel are shifted by shifting the guide vane while the compressor is regulated, they must always guide the flow from the axial direction into another direction, partially in the direction of rotation of the compressor rotor (co-torque) or partially in the opposite direction (counter-torque).

As mentioned, when a certain angle of the oncoming flow is exceeded, the flow to the profile becomes discontinuous.

In one regulating direction, which extends into the partial-load region, such exceeding of the flow-discontinuity angle causes additional losses which are initially not noticeable externally at the compressor stage or in the total compressor. Indeed, the increase of the losses may be compared to choking, an effect which is not desired, but which, however, is effective in the desired regulating direction.

If, however, regulation occurs in the other direction, i.e., in the excess region, the discontinuity of the flow is externally noticeable by a sudden reverse regulating effect. Instead of the compression ratio of the massive through-put through the machine being increased, a counter-effect occurs, beginning at a certain boundary angle. Additional losses occur not only in the entrance guide wheel but, above all, in the successive carrying wheel, through the detached flow regions which are very turbulent, so that the desired effect is not only voided, but is even turned into its opposite.

Previously it was sometimes customary to shift the vanes of the entrance guide wheel in muti-stage machines by a smaller angle than, for example, the vanes of the first center guide wheel which is arranged between the first and second carrying wheel.

Apparatus for differentiated coupled shifts of two rows of guide vanes, interconnecting in flow direction of a turbo compressor, are known (DE-OS No. 24 03 113; DE-OS No. 25 02 986). In these apparatus, the rows of guide vanes are arranged successively and axially to the direction of the rotor axis. The centers of rotation of the guide vanes which are, in each case, arranged successively in flow direction, lie on the line extending parallel to the rotor axis.

However, in this type of arrangement of the vanes, it is not possible, with a maximal flow guide in one or the other regulating sense, to achieve an aerodynamically optimal gap between the cooperating vanes or an optimal flow.

Furthermore, apparatus for regulating turbo-compressors by shifting guide vanes are known, in which the guide vanes are not rigidly formed but have an articulated profile. This may cause very advantageous aerodynamic conditions. Constructions of that type are described in the NASA reports TND-3823 of January 1967 and CR-54534 PWAFR-2112 of Aug. 2, 1968 of the National Aeronautics and Space Administration, Washington, D.C.

The following constructions, for example, are known from these reports:

Arrangement of two-piece vanes, consisting of a rigid fin and a controlled rudder.

A rudder, provided with a gap.

A fin with a curved rear element.

A rudder dissembled into several elements.

These multi-joined vanes produce the desired effect; however, they are of a complicated constructional design.

SUMMARY OF THE INVENTION

It is, therefore, the objective of the present invention to increase the regulating effect of the entrance guide wheel while avoiding or deferring the discontinuity of the flow with the simplest possible means. This objective is achieved, according to the present invention, by the characteristics of the elements indicated in patent claim 1. Advantageous further developments of the present invention are contained in the dependent claims.

Two rows of guide vanes are arranged successively in the flow direction. They are adjusted in tandem by means of an adjustment ring, which orients the guide vanes so that the angle of incidence to the flow of the first row is at a fixed ratio to the angle of incidence of the second row. In a preferred embodiment, this is achieved by having the guide vanes connected to the adjustment ring by levers having lengths in this fixed ratio.

A very simple construction was developed by the invention, apart from the fact that a tandem wheel was advantageously used. Due to the arrangement of the guide vanes, the gap effect in both the end positions may be optimized, while the gap is still effective between these end positions, even when not optimal.

Tests have shown that an essentially improved regulating behavior in the partial-load region, as well as in the excess-load region, was obtained with the apparatus, according to the present invention. The regulating effectiveness of the entrance guide wheel has increased, while the flow discontinuity is avoided or deferred. This has caused the degree of effectiveness to increase. Above all, avoiding or delaying the flow discontinuity has made it possible to enlarge the excess-load region while the regulating effectiveness in the entrance guide wheels was reversed by the detached flow. This phenomenon has only been avoided before by using the very complicated prior design.

Furthermore, the design of the adjustment ring is essentially simplified and advantageous in that the angle coordination, around which the rows of vanes pivot, may be determined by the length of the levers.

Exemplary embodiments are represented in the attached drawings as follows.

BRIEF DESCRIPTION OF DRAWING

FIG. 5 is a perspective representation of the vanes, according to FIG. 2, with an element of an adjustment ring.

DETAILED DESCRIPTION OF THE INVENTION

Figure 1:
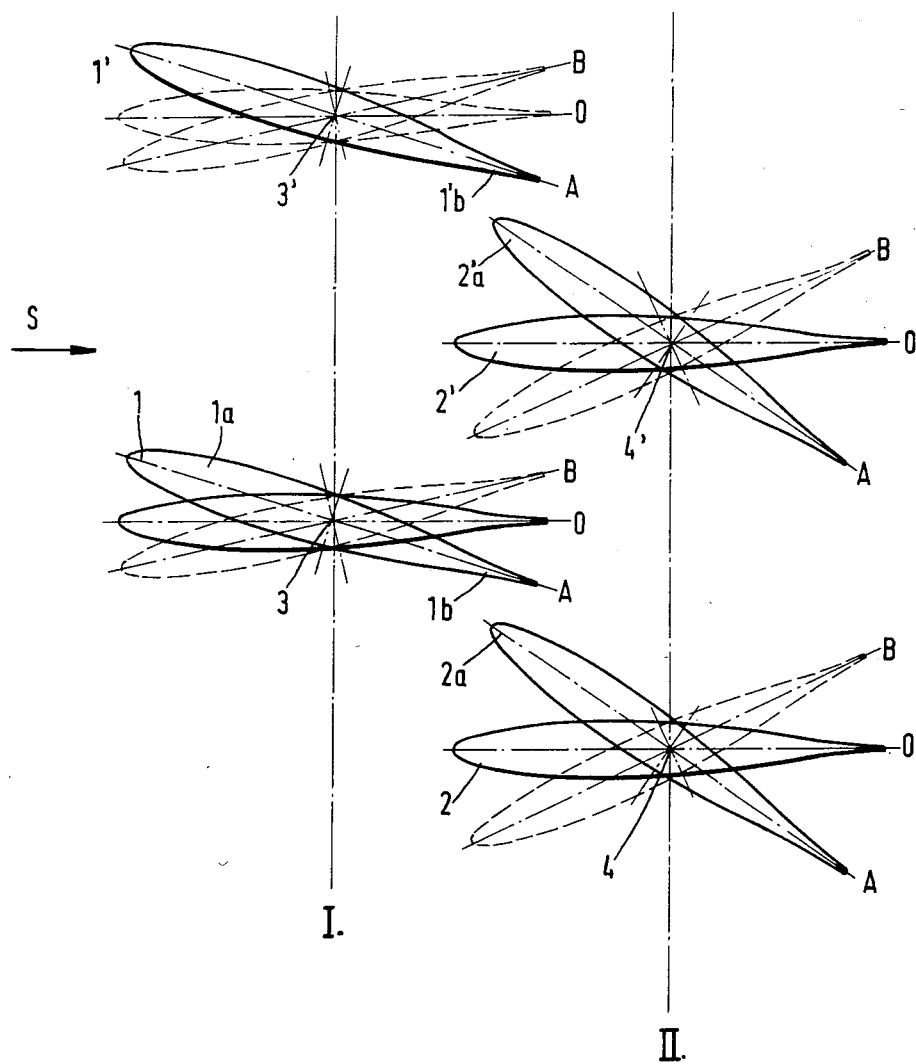
FIG. 1 is a schematic top view of the vane arrangement on an unwound vane-wheel surface.

As is shown in FIG. 1, two interconnecting rows of vanes I and II (in tandem arrangement) are provided. The flow comes from the side, which is designated with an arrow S. This representation is based on the fact that a certain guide angle A in one regulating direction is produced as maximum while in the other regulating direction the maximum is represented as another guide angle B.

The guide vanes of the first row of vanes I are marked 1 and 1'. They are pivotally arranged around the rotary axes 3 and 3'. The arrangement of the second row II of guide vanes 2, 2', with the rotary axes 4 and 4', is analogous to the arrangement of the first row of vanes I.

Three positions of each vane are indicated in the drawing: O is the neutral position in which the chords of the vane profiles are in the direction of flow; A and B characterize the two torque positions ("positive" torque and "negative" torque). The adjustment angles of the row of vanes II are initially larger than the row of vanes I. The angle of incidence of the guide vanes in row I is at a certain ratio to the angle of the guide vanes of row II. This ratio results from the design of the adjustment ring, as will be explained in more detail later.

In the represented example, the lengths of the chords of the vanes 1 and 1' equal the lengths of the chords of the vanes 2 and 2'. The chord lengths may, however, also be varied.

As may also be seen from FIG. 1, as viewed in the direction of the rotor axis, a guide vane 2 or 2' of the second row II is arranged between each two adjacent guide vanes 1, 1' of the first row of vanes I. In this regard, the distance of the centers of the guide vanes 3 and 4 of the two rows of guide vanes I and II in the direction of the rotor axis, as well as the distance of each of two adjacent centers of guide vanes 1, 1' and 2, 2' of the row of vanes I and II, and the chord lengths of the guide vanes 1, 2, are coordinated so that when the guide vanes are adjusted for producing a desired, maximal guide angle in either sense of the regulation, i.e., positions A or B, a vane 1 of the first row of vanes I cooperates with an adjacent vane 2 or 2' of the second row of vanes II. What is essential is that between the respectively cooperating guide vanes 1 and 2 or 2', there remains an effective gap so that an optimal flow may occur.

In other words, the guide vanes are arranged in such a manner that, observed vertically to the direction of the rotor axis in position A, the nose area 2a of the guide vane 2 covers the rear-edge area 1b of the adjacent guide vane 1 of the first vane row I.

The corresponding adjustment of the vane 1' and 2', etc., is analogous.

An effect is produced in the process of through-flow of the gap between the vanes 1, 2 and 1', 2', etc., adjusted in position A, which resembles the effect of nose flap and landing flap in aeroplane wings. This assures the optimal through-flow of the vanes.

Figure 3:
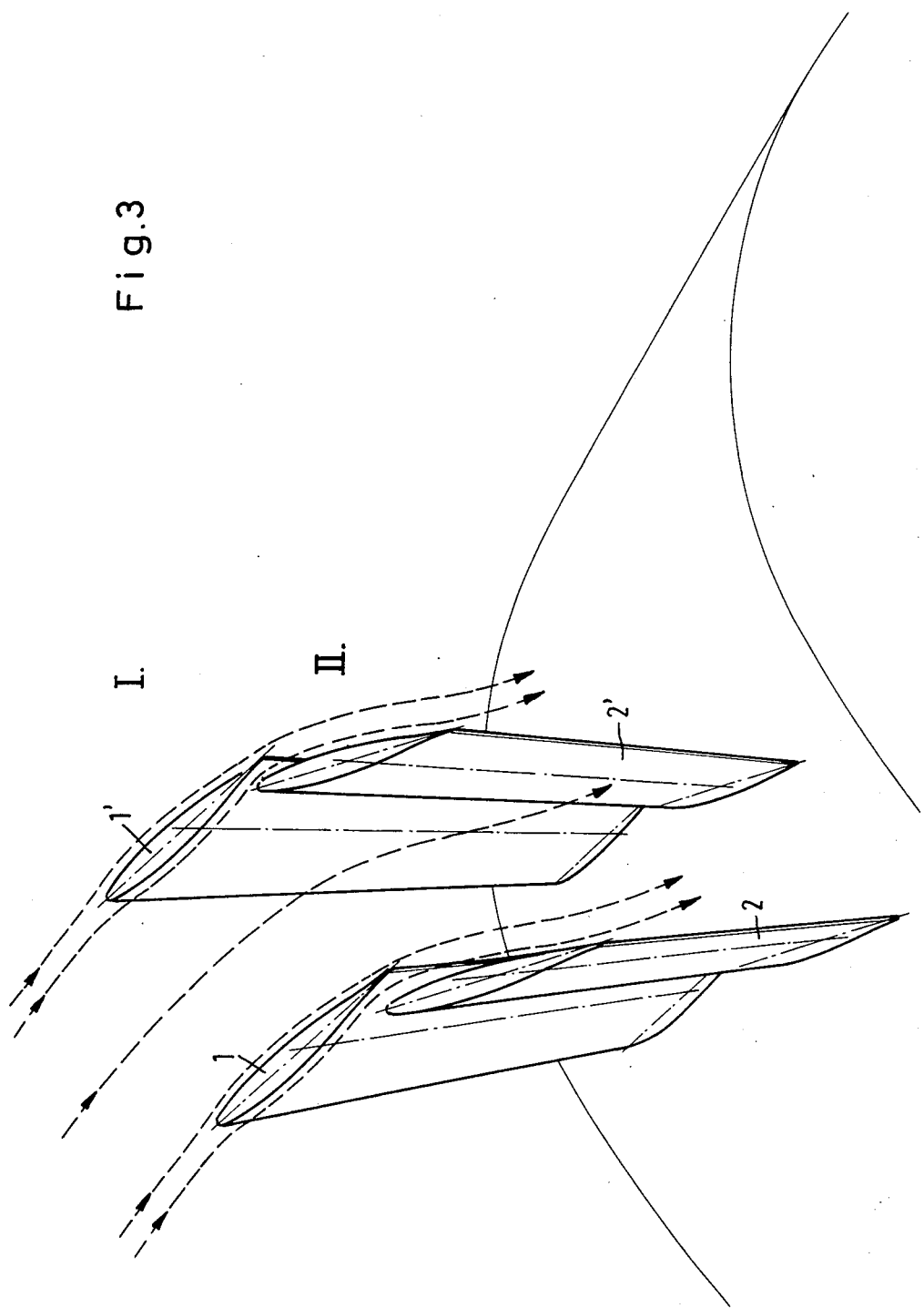
FIG. 3 shows the vanes, according to FIG. 2, in torque position.

A perspective view of part of the guide-vane wreath with vanes 1, 2 and 1', 2' adjusted to "positive" torque is represented in FIG. 3.

Figure 2:
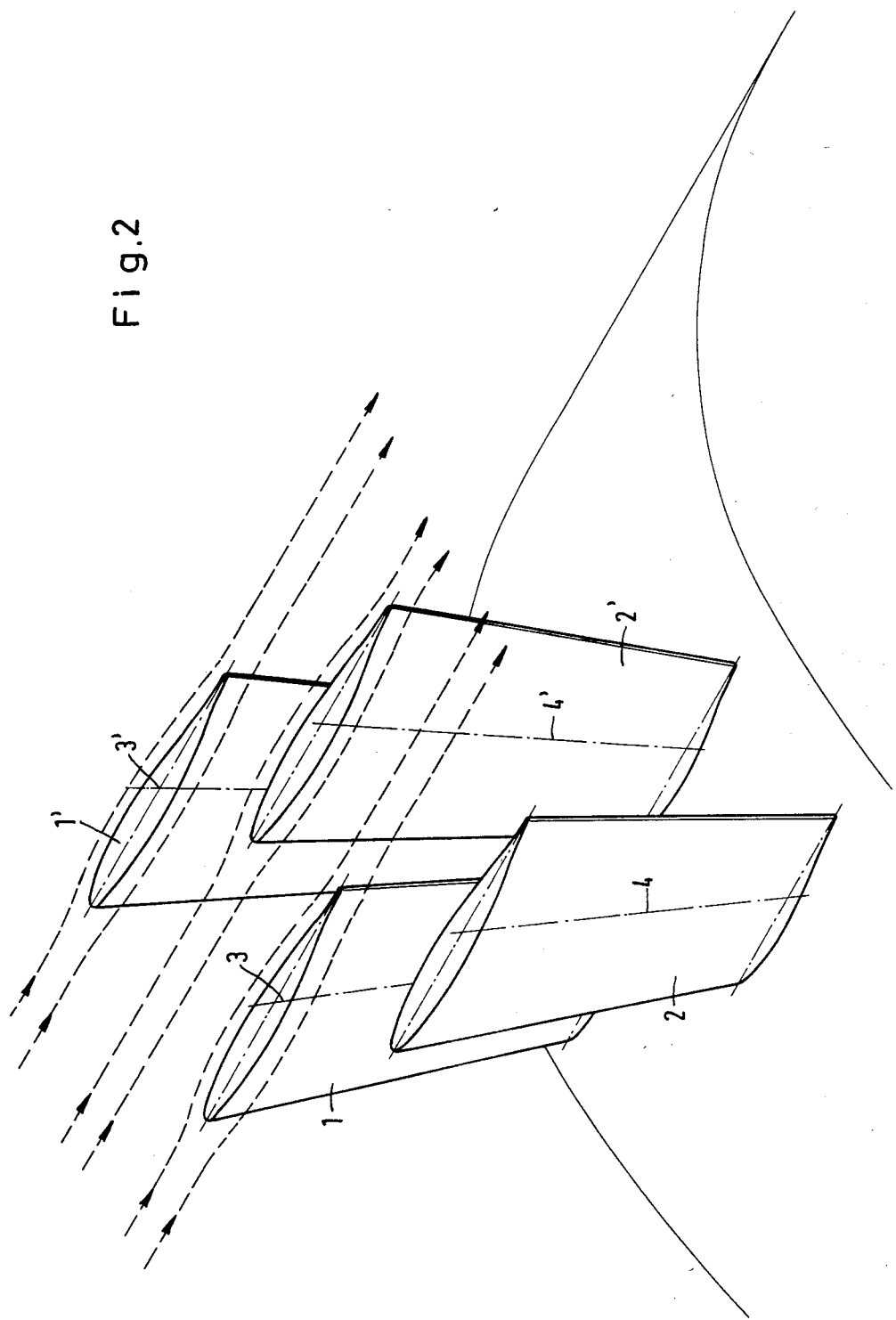
FIG. 2 is a perspective representation of part of a vane arrangement in neutral position.

FIG. 2 shows a part of the guide-vane wreath with vanes adjusted to neutral position (cf. FIG. 1, position"O"). In this case, the chords of the vanes 1, 2 and 1', 2' lie towards each other and parallel to the rotor axis. The flow passes through the vanes essentially parallel to the rotor axis.

Figure 4:
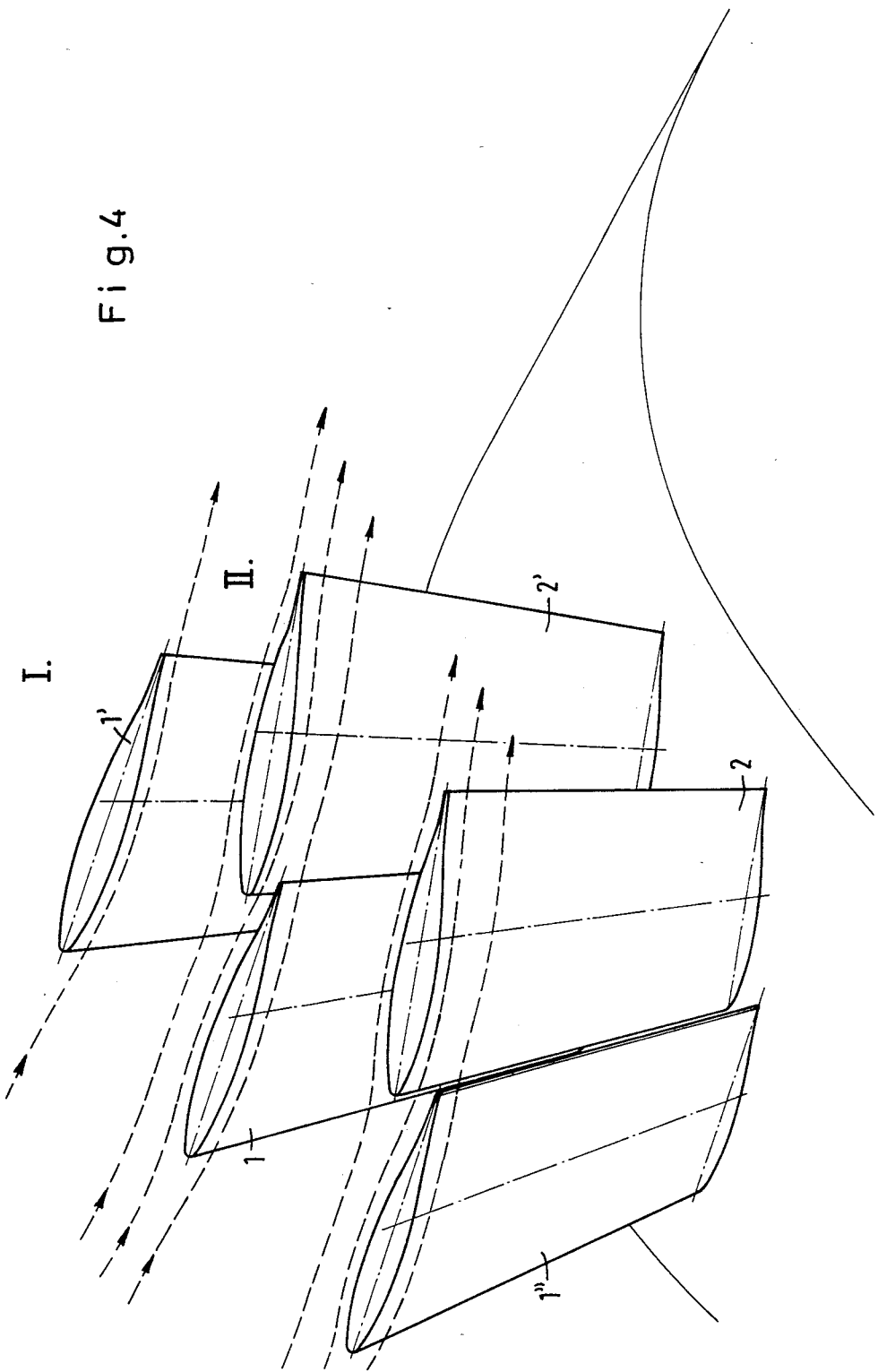
FIG. 4 shows the vanes, according to FIG. 2, in another torque position.

FIG. 4 is the perspective representation of the vanes 1, 2' and 1', 2 adjusted to "negative" torque (cf. FIG. 1, position "B"), with flow lines indicated. In this adjusted position, observed in the direction vertical to the rotor axis, the rear-edge area of the vane 1' or 1 covers the nose area of vane 2 or 2'.

The mechanism for adjusting the guide vane is detailed below by means of FIG. 5. In the position as illustrated, the vanes 1, 2 and 1', 2' are in the neutral position.

The vanes are in each case firmly connected by shafts 9 (vanes 1 and 1') and 8 (vanes 2 and 2') with levers 7 (7')

and 6 (6'), respectively. The shafts 8 and 9 are pivotally positioned in a casing, not illustrated.

Furthermore, all the vanes of the two rows of vanes I and II of the guide-vane wreath are equipped in the same manner as the respesented vanes 1, 1' and 2, having the bearing and levers.

The vanes are adjusted via a partially illustrated adjustment ring 5.

The levers 6 and 7 are positioned in the adjustment ring 5 by shafts 10 and 11. Oval openings 12 extending towards the rotor axis are provided for the shafts 11 at the adjustment ring 5.

FIG. 5 shows that the ratio of the angle of adjustment of the first row of vanes I with vanes 1, 1', etc., to the angle of adjustment of the second row of vanes II with the vanes, 2, 2', etc., is determined by the ratio of the length of lever 6 to the length of lever 7. It is through the lengths of the levers that the arrangement of the angles to each other is determined at a precise ratio.

I claim:

1. An improved stator assembly stage for an axial compressor, comprising
   (a) a first row of leading guide vanes mounted radially about a first cylindrical surface, said cylindrical surface having a center rotating axis coaxial with the longitudinal axis of said axial compressor, said leading guide vanes being uniformly, circumferentially spaced around said first cylindrical surface,
   (b) a second row of trailing guide vanes mounted radially about a second cylindrical surface coaxial with said first cylindrical surface, said second row of trailing guide vanes being located successively to said first row of guide vanes in an air flow direction, said trailing guide vanes being uniformly, circumferentially spaced around said second cylindrical surface,
   (c) each of said trailing guide vanes being uniformly spaced between respective pairs of leading guide vanes whereby said trailing guide vanes are uniformly staggered with respect to said leading guide vanes,
   (d) each of said guide vanes having a straight longitudinal vane axis, each guide vane being symmetrical about said vane axis,
   (e) each guide vane being provided with a nose end at its leading end and a rear end at its trailing end in said air flow direction,
   (f) said nose ends of each of said trailing guide vanes overlapping, when viewed vertically, at least a portion of said rear ends of said leading guide vanes during all degrees of angular rotation for both positive and negative torque regulation of said axial compressor,
   (g) means for mounting each of said guide vanes for selective angular rotation about a vane adjustment axis extending radially with respect to said longitudinal axis of said axial compressor and through the midpoint of said vane axis,
   (h) a neutral position of each guide vane being defined as a 0° angular deviation of said vane axis from the air flow direction entering said axial compressor in a direction parallel to said longitudinal axis of said axial compressor,
   (i) vane angular adjustment means associated with each of said guide vanes for rotating said guide vanes about said vane adjustment axes into selectable angular positions deviating from said neutral positions, said rotating of said guide vanes about said vane adjustment axes serving to establish an aerodynamically effective gap between each single guide vane of said first row and one of two, depending on whether positive or negative torque regulation is being established, successive, in air flow direction, adjacent guide vanes in said second row, said aerodynamically effective gap being capable of being established for both positive and negative torque of said stator assembly stage,
   (j) a ring means cooperating with all of said adjustment means for simultaneous adjustment of all of said guide vanes,
   (k) said ring means operating uniformly on all of said leading guide vanes to rotate all of said longitudinal vane axes of said leading guide vanes to a selected, uniform first angle of incidence with respect to the actual air flow direction,
   (l) said ring means operating uniformly on all of said trailing guide vanes to rotate all of said longitudinal vane axes of said trailing guide vanes to a selected, uniform second angle of incidence with respect to said actual air flow direction, and
   (m) the ratio of said first angle of incidence to said second angle of incidence being fixed.

2. The improved stator assembly as claimed in claim 1, further comprising
   (a) a lever arm connected on one end to each of said guide vanes,
   (b) said lever arms being connected on their other ends to said ring means,
   (c) a first group of said lever arms attached to said leading guide vanes of said first row, having a first, predetermined length,
   (d) a second group of said lever arms, attached to said trailing guide vanes in said second row, having a second predetermined length, and
   (e) the ratio of said first angle of incidence to said second angle of incidence being the same as the ratio in length of said second group of levers to said first group of levers.

3. The improved stator assembly stage as claimed in claim 2, wherein said second predetermined length is less than said first predetermined length.

* * * * *